W. & A. C. E. BROWN & T. B. MERRY.
RELEASE SAFETY HOOK.
APPLICATION FILED MAR. 12, 1913.
1,110,185.
Patented Sept. 8, 1914.
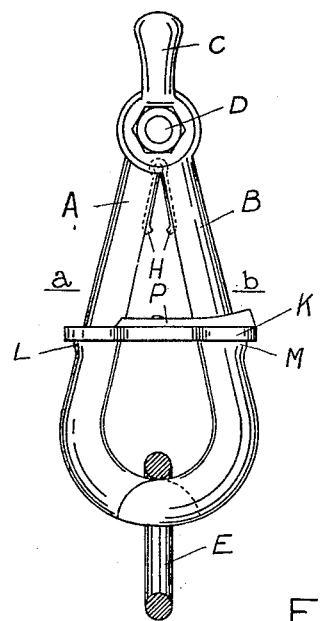
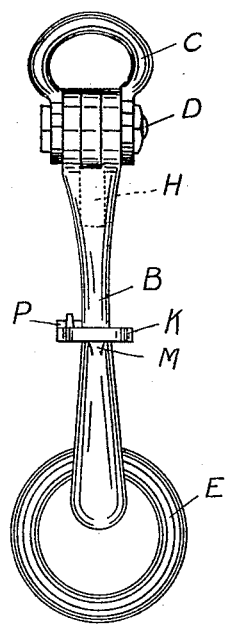
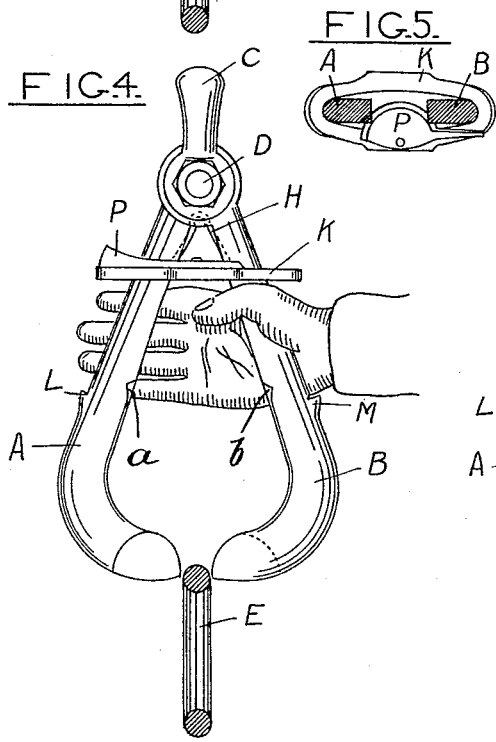
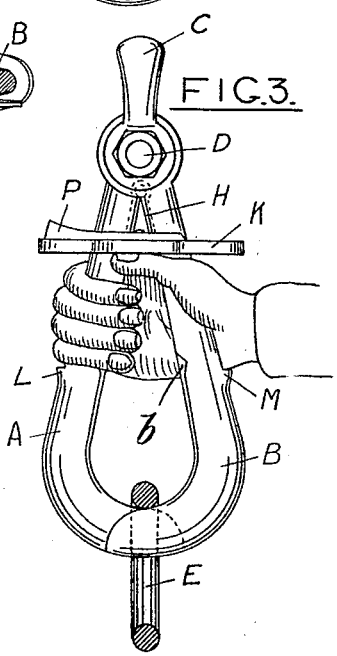
WITNESSES
W. E. Baker
A. L. Kitchin
INVENTORS
WILLIS BROWN
ALEXANDER CHARLES EDGAR BROWN
THOMAS BODEN MERRY
BY Munn & Co
ATTORNEYS

UNITED STATES PATENT OFFICE.

WILLIS BROWN, ALEXANDER CHARLES EDGAR BROWN, AND THOMAS BODEN MERRY, OF ADELAIDE, SOUTH AUSTRALIA, AUSTRALIA.

RELEASE SAFETY-HOOK.

1,110,185.  Specification of Letters Patent.  Patented Sept. 8, 1914.

Application filed March 12, 1913. Serial No. 753,744.

*To all whom it may concern:*

Be it known that we, WALLIS BROWN, ALEXANDER CHARLES EDGAR BROWN and THOMAS BODEN MERRY, subjects of the King of Great Britain and Ireland, and residents of Adelaide, State of South Australia, Commonwealth of Australia, have invented a certain new and useful Improved Release Safety-Hook, of which the following is a specification.

This invention has been especially devised for use with boat davits for securely holding and quickly releasing ships' boats, but it may be used in connection with general lifting and other purposes where hooks are required.

Our improved hook comprises two side members, a shackle, a spring, and a locking ring, and in order that it may be clearly understood we will describe the same with reference to the accompanying drawings in which—

Figures 1 and 2 are front and side views of our safety hook closed, the two members of the hook being held together by the locking ring. Fig. 3 is a front view of our safety hook closed, the locking ring having been raised and the two members being held together by the seaman's hand, or by the suspended weight. Fig. 4 is a front view of our safety hook opened. Fig. 5 is a cross section on line $a\ b$ of Fig. 1 just above the locking ring.

A and B are the two side members which form the hook proper and which are pivoted together at their upper ends and to the shackle C by means of the bolt D forming a knuckle joint. Their lower ends are turned inwardly and halved together and overlapped, the point of each passing beyond the center line of the hook and such overlapping portion being tapered off as to its upper edge to allow instantaneous release of the ring E when the two members are released and the spring H is allowed to operate.

The shackle C permits the hook to be secured to a rope whereby the hook is suspended. The ring E is connected to the boat or other weight to be carried by the hook.

The spring H is housed between the side members in suitable sockets or recesses therein just below the knuckle joint, and when allowed to operate forces the two members apart.

The locking ring K encircles the side members A and B and, when in normal position, holds them together against the pressure of the spring. Upon the two side members A and B are stop lugs L and M which limit the downward movement of the ring K.

Upon the top side of the ring K is pivoted a catch P the edge of which engages small notches $a\ b$ in the face of the side members A and B and prevents the accidental raising of the ring.

Normally, as when a boat is being lowered, the several parts are in the position shown in Figs. 1, 2 and 5, the locking ring K holding the two side members A and B of the hook together. When the seaman receives the order to "stand by" he seizes the hook with his hand, and first turns the catch P upon its pivot from the position shown in Fig. 1 to that shown in Figs. 3 and 4, so releasing the ring K, and then slides the ring upward and holds the two side members together with his hand as shown in Fig. 3.

As soon as the boat is waterborne and the seaman receives the order to "let go" he merely opens his hand and the spring H throws the members apart opening the hook and releasing the ring E with the boat instantaneously.

It is of course to be understood that, when used in connection with a boat, one of our hooks is used at each end of the boat.

Having now fully described and ascertained our said invention and the manner in which it is to be performed we declare that what we claim is—

1. In an improved release safety hook having two side members pivoted together and to a shackle at their upper ends and having their lower ends turned inwardly and halved together and overlapped, a spring housed between the said side members and tending to open them, and a locking ring encircling the said side members and slidable thereon so that when in its lower position the side members are held closed but when in its upper position the side members may be opened by the spring, the said locking ring carrying a pivoted catch adapted to engage notches in the faces of the side members when the locking ring is in its lower position.

2. A device of the character described, comprising a pair of pivoted and spring pressed members having substantially hook-shaped ends adapted to overlap one another, a ring freely slidable on said members, and a member mounted on the ring and adapted to project between and into engagement with the said members.

3. A device of the character described, comprising a pair of hinged side members formed with overlapping hook ends, each of said side members being formed with a notch intermediate its length and with a stop adjacent said notch, spring means for acting on said side members for tending to open the same, an encircling loop member designed to engage said side members and rest against said stops for holding said side members together, and a pivotally mounted catch formed with a projection adapted to fit into the notches in said side members for locking the said loop member against movement.

In testimony that we claim the foregoing as our invention we have signed our names in the presence of two subscribing witnesses this 5th day of February, 1913.

WILLIS BROWN.
ALEXANDER CHARLES EDGAR BROWN.
THOMAS BODEN MERRY.

Witnesses:
ARTHUR GORE COLLISON,
BARBARA BROWN.

---

Copies of this patent may be obtained for five cents each, by addressing the "Commissioner of Patents, Washington, D. C."